United States Patent
Stevenson

(10) Patent No.: US 8,972,972 B2
(45) Date of Patent: Mar. 3, 2015

(54) HANDSHAKING METHODOLOGY AND REDUNDANT DATA CHANNEL BETWEEN SERVERS DURING SOFTWARE UPGRADE

(71) Applicant: Elemental Technologies, Inc., Portland, OR (US)

(72) Inventor: Davis V. Stevenson, Portland, OR (US)

(73) Assignee: Elemental Technologies, Inc., Portland, OR (US)

( * ) Notice: Subject to any disclaimer, the term of this patent is extended or adjusted under 35 U.S.C. 154(b) by 127 days.

(21) Appl. No.: 13/653,721

(22) Filed: Oct. 17, 2012

(65) Prior Publication Data

US 2014/0075425 A1     Mar. 13, 2014

Related U.S. Application Data

(60) Provisional application No. 61/700,454, filed on Sep. 13, 2012.

(51) Int. Cl.
*G06F 9/44*      (2006.01)
*G06F 9/445*     (2006.01)
*G06F 15/16*     (2006.01)

(52) U.S. Cl.
USPC ........... 717/171; 717/170; 717/172; 717/169; 717/175; 717/176; 709/248

(58) Field of Classification Search
None
See application file for complete search history.

(56) References Cited

U.S. PATENT DOCUMENTS

| | | | |
|---|---|---|---|
| 5,442,749 A * | 8/1995 | Northcutt et al. | 709/219 |
| 6,199,204 B1 * | 3/2001 | Donohue | 717/178 |
| 7,228,539 B2 * | 6/2007 | Zhang et al. | 717/171 |
| 7,362,349 B2 * | 4/2008 | Nelson et al. | 348/14.08 |
| 7,653,911 B2 * | 1/2010 | Doshi et al. | 719/313 |
| 7,739,680 B1 * | 6/2010 | Thakur et al. | 717/172 |
| 7,996,829 B2 * | 8/2011 | Depew et al. | 717/170 |
| 8,417,737 B2 * | 4/2013 | Hopmann et al. | 707/803 |
| 8,578,376 B2 * | 11/2013 | Natchadalingam et al. | 718/1 |
| 8,793,680 B2 * | 7/2014 | Jeong | 717/170 |
| 2010/0071025 A1 * | 3/2010 | Devine et al. | 726/1 |
| 2012/0311568 A1 * | 12/2012 | Jansen | 718/1 |
| 2014/0059529 A1 * | 2/2014 | Banavalikar et al. | 717/170 |

* cited by examiner

*Primary Examiner* — Don Wong
*Assistant Examiner* — Devayani R Talukdar
(74) *Attorney, Agent, or Firm* — Christopher P. Maiorana, PC

(57) ABSTRACT

A method for upgrading software having steps (A) to (D) is disclosed. Step (A) may deny a first server access to read from and write to a database controlled by a second server while second software in the second server is being upgraded. The second software as upgraded may be incompatible with first software running in the first server. Step (B) may generate data in the first server in response to a current operation of the first software while the second software is being upgraded. Step (C) may update the database by transferring the data from the first server to the database through the second server after the upgrade of the second software has finished. The first server generally remains denied to read from the database. Step (D) may upgrade the first software to be compatible with the second software in response to finishing the current operation.

20 Claims, 9 Drawing Sheets

HANDSHAKING METHODOLOGY AND REDUNDANT DATA CHANNEL BETWEEN SERVERS DURING SOFTWARE UPGRADE

This application claims the benefit of U.S. Provisional Application Ser. No. 61/700,454, filed Sep. 13, 2012, which is hereby incorporated by reference.

FIELD OF THE INVENTION

The present invention relates to distribution systems generally and, more particularly, to a method and/or architecture for a handshaking methodology and a redundant data channel between servers during software upgrade.

BACKGROUND OF THE INVENTION

During a time where a master node is being upgraded, all data on live events running on a slave node is lost. Without protections keeping the slave node from connecting to the master database when the code versions are incompatible, the slave node could access an incompatible database that would cause the slave node to become unstable and crash.

It would be desirable to implement a handshaking methodology and a redundant data channel between servers during a software upgrade.

SUMMARY OF THE INVENTION

The present invention concerns a method for upgrading software having steps (A) to (D). Step (A) may deny a first server access to read from and write to a database controlled by a second server while second software in the second server is being upgraded. The second software as upgraded may be incompatible with first software running in the first server. Step (B) may generate data in the first server in response to a current operation of the first software while the second software is being upgraded. Step (C) may update the database by transferring the data from the first server to the database through the second server after the upgrade of the second software has finished. The first server generally remains denied to read from the database. Step (D) may upgrade the first software to be compatible with the second software in response to finishing the current operation.

The objects, features and advantages of the present invention include providing a handshaking methodology and a redundant data channel between servers during a software upgrade that may (i) use the redundant data channel to relay information on the status of live events from an encoder node to a controller node, (ii) provide a database disconnection and handshaking mechanism to prevent the encoder node from gaining access to an incompatible version of the database, (iii) implement an upgrade process of the controller node while controlling multiple encoder nodes that are transcoding live events, (iv) prevent incompatible encoder nodes from accessing the upgraded database on the controller node, (v) avoid encoder node crashes during the live events due to the incompatible database, (vi) upgrade the encoder nodes running live events during different windows in time, (vii) allow some encoder nodes running important live events not to upgrade until after a particular time, (viii) allow the upgrade process of the controller node and the encoder nodes to be distributed over a long period while preventing a loss of data, (ix) provide a more pleasant upgrade experience, (x) implement a MySQL database manager and/or (xi) implement a MySQL database.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

A networked system may include a controller server (or node) and one or more encoder servers (or nodes). The controller server generally contains (or controls) a database used for all of the servers. While the encoder servers may be encoding and/or transcoding one or more live events, the controller server may be upgraded (or updated or reconfigured) with new code. The new code and/or resulting changes to the controller database may be incompatible with the code running on the encoder servers. The encoder servers are generally disconnected from the controller database when the code running in the encoder servers is incompatible with the controller database. Data concerning the status of the live events running on the encoder servers may continue to be gathered, updated and queued, even when the encoder servers cannot contact the controller database. A respective encoder server may automatically reconnect to the controller server and the controller database once the code on that encoder server has been upgraded or reconfigured to a compatible version. The queued data may subsequently be updated in the controller database. The entire upgrade cycle generally prevents the loss of data while allowing the encoder servers to continue processing the live events.

Examples of data that the encoder servers may save to the database while live events are running may include, but are not limited to, information on the status of running events (e.g., frames per second, audio gain, status of individual outputs, etc.). Events may include, but are not limited to, when a live event switches to a different input source. Messages from the encoding/transcoding, such as errors, warnings and/or audit messages may also be stored in the database. Alerts, such as below-realtime alerts, loss of input alerts, and the like may be stored. Live event state changes, such as when a live event completes, experiences an error and/or is manually cancelled may be stored in the database.

Figure 1:
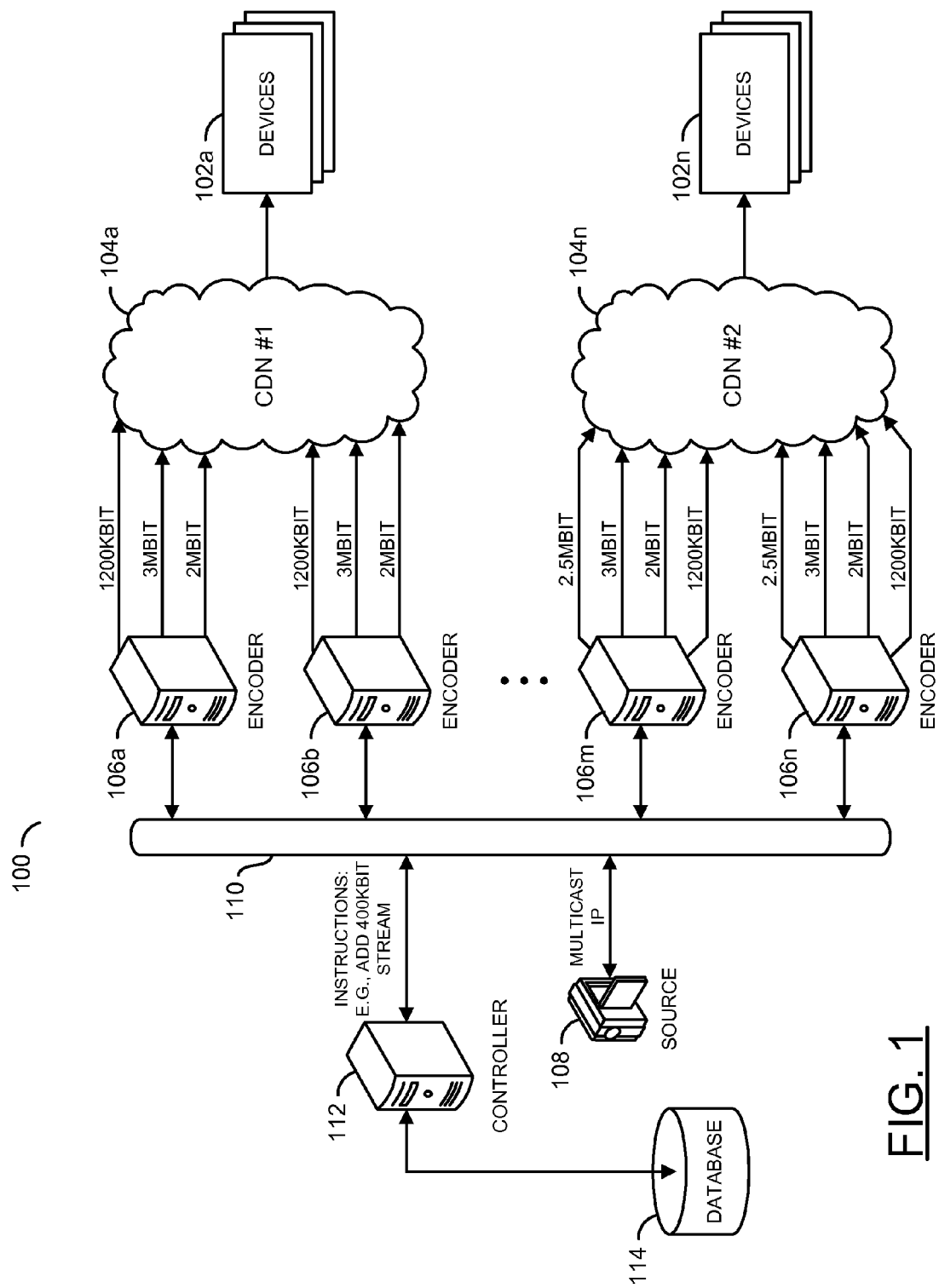
FIG. 1 is a diagram of a system illustrating a video processing deployment system.

Referring to FIG. 1, a diagram of a system 100 is shown illustrating a video processing deployment system. The system 100 may comprise a number of client devices 102a-102n, a number of content distribution networks (e.g., CDNs)/mobile carriers (e.g., MCs) 104a-104n, a plurality of encoder server computers (or encoders or transcoders or coders or slave server computers) 106a-106n, one or more video (or content) source devices (or circuits) 108, one or more video deployment networks 110, and a controller server computer (or master server computer) 112. In an example, player applications may reside on a number of client devices 102a-102n. The client devices 102a-102n may include computers, set-top boxes, cellular telephones, tablets, and other mobile devices. The client devices 102a-102n may be configured to receive content (e.g., video, audio, audio-video, etc.) from the CDNs/MCs 104a-104n. The client devices 102a-102n may be connected to the CDNs/MCs 104a-104n using wired (e.g., cable), wireless (e.g., Wi-Fi, satellite, etc.), third generation (e.g., 3G) links, and/or fourth generation (e.g., 4G) links. Communication between the client devices 102a-102n and the CDNs/MCs may be handled by protocols including, but not limited to, hypertext transfer protocol (e.g., HTTP) and/or real time message protocol (e.g., RTMP). Streaming technologies such as Pantos from Apple, Inc. or Smooth Streaming from Microsoft Corp. may be used. The CDNs/MCs 104a-104n generally make a plurality of streams available to the client devices 102a-102n. The plurality of streams are generally created by the plurality of servers 106a-106n. For example, the servers 106a-106n may encode or transcode video received from the source 108 via multicast Internet protocol (e.g., IP) on the network 110. However, the video may also be raw video on a serial digital interface (e.g., SDI) or a high-definition serial digital interface (e.g., HD-SDI) and files over file transfer protocol (e.g., FTP), etc. Parameters used by the servers 106a-106n in encoding/transcoding the plurality of streams are generally managed/adjusted by the server 112 (e.g., via the network 110). The controller server 112 and the encoder servers 106a-106n may be configured in a typical master/slave communication model where the server 112 has control over the servers 106a-106n.

The server 112 may be configured to control parameters of the system 100. The control may optimize the system parameters based upon one or more factors, including, but not limited to, information on the status of running events, when a live event switches to a different input source, live event state changes, such as when a live event completes, experiences an error and/or is manually cancelled, messages from the encoding/transcoding, such as errors, warnings and/or audit messages, and alerts, such as below-realtime alerts and loss of input alerts. The server 112 may also communicate with a database 114. The database 114 may compile (or store) the information, metrics, alerts and errors generated during by the servers 106a-106n while performing the encoding/transcoding operations.

The servers 106a-106n may operate in redundant pairs. For example servers 106a and 106b may form a pair that provides video to the CDN #1. The servers 106m and 106n may for another pair that provides video to the CDN #2. At any given moment in time, a primary server of the servers 106a-106n (e.g., 106a, 106c, 106e, . . . , 106m) within each pair may actively encode/transcode the video while a backup server 106a-106n (e.g., 106b, 106d, 106f, . . . , 106n) remains operational and ready to take over should the primary server become unavailable. By providing the redundancy among the servers 106a-106n, software in some servers 106a-106n (e.g., the backup servers 106a-106n) may be upgraded or reconfigured while the primary servers 106a-106n are busy providing video to the devices 102a-102n. Once the backup servers 106a-106n have been upgraded or reconfigured and the current encoding/transcoding tasks (or operations) have ended, the backup servers 106a-106n may take over the encoding/transcoding of new video from the primary server 106a-106n while the primary servers 106a-106n are upgraded or reconfigured.

Figure 2:
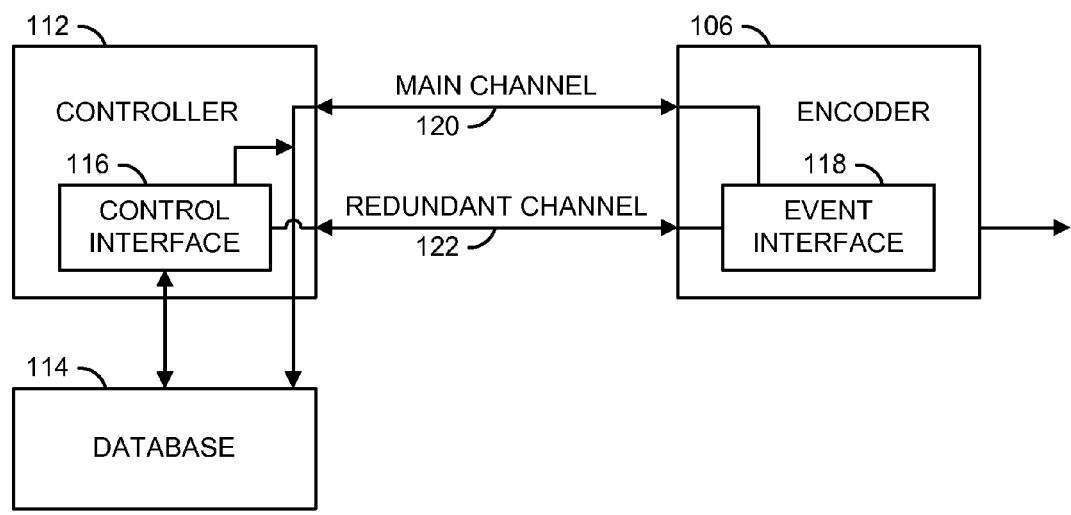
FIG. 2 is a detailed block diagram of a portion of the system.

Referring to FIG. 2, a detailed block diagram of a portion of the system 100 is shown. The controller server 112 generally comprises a control interface module (or block or circuit) 116. Each encoder server 106a-106n (a single server 106 is illustrated) generally comprises an event interface module (or block or circuit) 118. The interface modules 116-118 may be implemented in hardware, software executing on hardware, firmware executing on hardware or any combination thereof.

A main data channel 120 through the network 110 generally links the controller server 112 and the encoder servers 106a-106n during normal operations. The main data channel 120 may allow the event interface module 118 to access (e.g., read from and write to) the database 114. The control interface module 116 within the controller server 112 generally controls the access to the database 114 by the encoder servers 106a-106n.

A redundant data channel 122 through the network 110 may link the controller server 112 and the encoder servers 106a-106n from time to time. While one or more of the encoder servers 106a-106n is executing software and/or firmware that is incompatible with the software and/or firmware executing in the controller server 112, the encoder servers 106a-106n may report data back to the controller server 112 via the redundant data channel 122 for entry into the database 114. Transfer of the data may be unidirectional from the encoder servers 106a-106n through the controller server 112 to the database 114. Generally, information does not flow from the database 114 to the encoder servers 106a-106n through the redundant data channel 122.

Control of the access to the database 114 via both the main data channel 120 and the redundant data channel 122 may be provided by the control interface module 116. The event interface module 118 may be operational to gather data that records encoding/transcoding events, including live encoding/transcoding events. While an encoder server 106a-106n is in communication with the controller server 112 via the main data channel 120, the data (e.g., errors, alerts, etc.) corresponding to the encoding/transcoding may be reported to the database 114 in real time (e.g., within a few seconds or less). While the controller server 112 is being upgraded, each encoder server 106a-106n may buffer the data corresponding to the encoding/transcoding in a queue and wait for the upgrade of the controller server 112 to complete. The upgrade of the controller server 112 may cause the software in the controller server 112, and/or information in the database 114 to be incompatible with the software in one or more of the encoder servers 106a-106n. Some encoder servers 106a-106n may not be upgraded at the same time as the controller server 112 because the encoder servers 106a-106n are busy encoding/transcoding live events that should not be stopped. Therefore, the non-upgraded encoder servers 106a-106n may communicate with the upgraded controller server 112 via the redundant data channel 122. Such encoder servers 106a-106n generally have restricted access to the database 114 via the redundant data channel 122 to store the data buffered in the queues and store new data generated by the encoding/transcoding operations.

Figure 3:
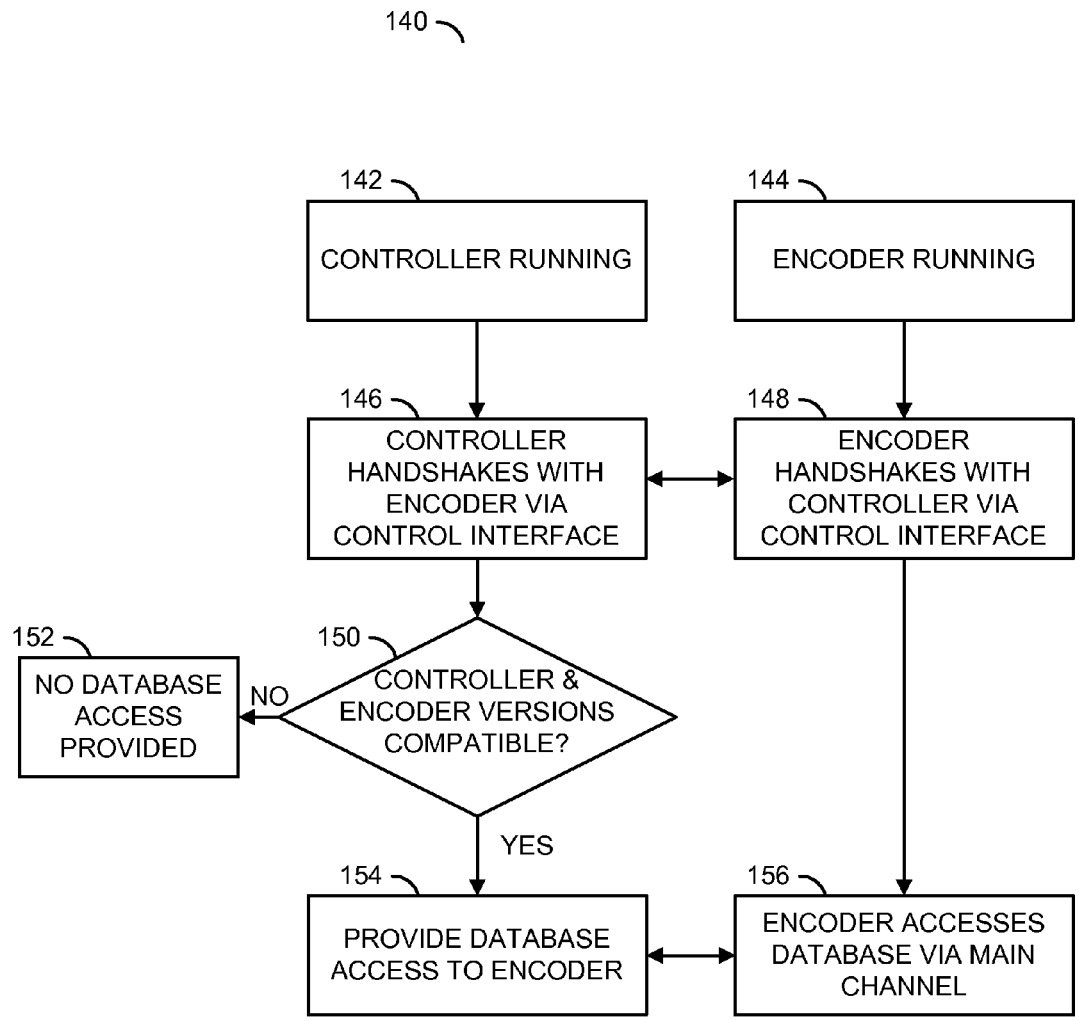
FIG. 3 is a flow diagram of an example implementation of a handshake method.

Referring to FIG. 3, a flow diagram of an example implementation of a handshake method 140 is shown. The handshake method (or process) 140 may be implemented in the controller server 112 and the encoder servers 106a-106n. The method 140 generally comprises a step (or state) 142, a step (or state) 144, a step (or state) 146, a step (or state) 148, a step (or state) 150, a step (or state) 152, a step (or state) 154 and a step (or state) 156. The steps 142-156 of the method 140 may be implemented in hardware, software executing on hardware, firmware executing on hardware or any combination thereof.

Consider a condition in which the controller server 112 may be set up appropriately. The appropriately set up controller server 112 generally contains or has direct access to the database 114. The controller server 112 may run a process that manages handshaking with encoder servers 106a-106n to provide database access. The controller server 112 may also run a process that provides a redundant communications channel (e.g., the redundant data channel 122) when appropriate. If an encoder server 106a-106n has successfully completed a handshake with the controller server 112, the encoder server 106a-106n may be granted access to the controller database 114 via the main data channel 120 and may stop communicating on the redundant data channel 122.

The method generally begins with the controller server 112 performing normal operations in the step 142 and one or more encoder servers 106a-106n (e.g., the encoder server 106a) performing normal operations in the step 144. The controller server 112 generally controls access to the database 114 in the step 146 via a handshaking process between the controller server 112 and the encoder server 106a. The encoder server 106a generally handshakes with the appropriate information in the step 148. As part of the handshake, the encoder server 106a may send version information to the controller server 112. The given version information may indicate to the controller server 112 that the encoder server 106a is running appropriate code to connect to the controller database 114 (e.g., schemas may match) and be controlled by the controller server 112.

The controller server 112 generally uses the version information to determine if the encoder server 106a is running a compatible (e.g., the same) version of software and/or firmware in the step 150. If the two versions are not compatible, the control interface module 116 within the controller server 112 may deny the encoder server 106a access to the database 114 in the step 152.

If the encoder server 106a is executing compatible software (and optionally compatible firmware), the control interface module 116 may grant the encoder server 106a access to the database in the step 154. The encoder server 106a may subsequently access the database in the step 156 via the main data channel 120.

Figure 4:
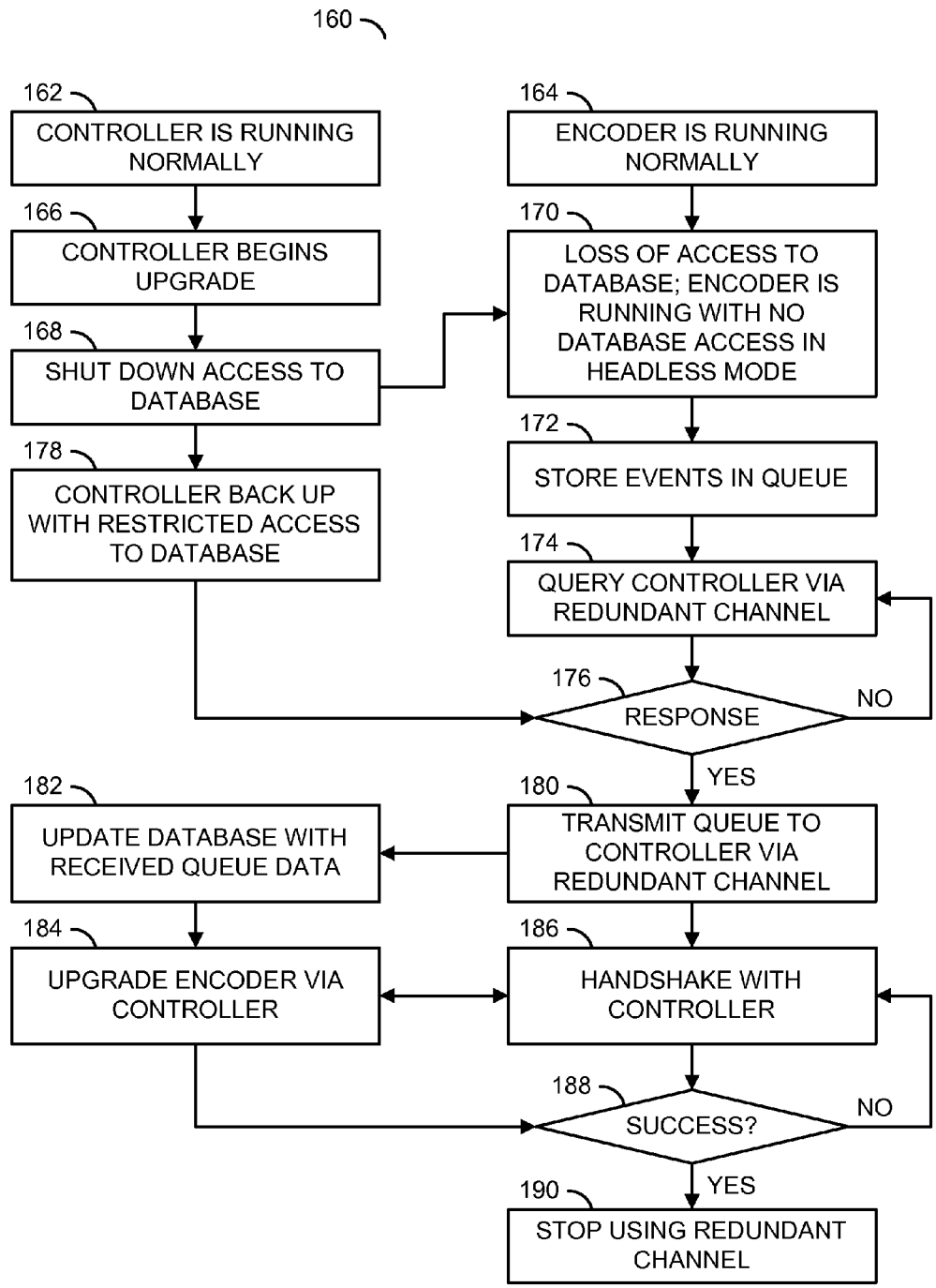
FIG. 4 is a flow diagram of an example implementation of a method for upgrading software in accordance with a preferred embodiment of the present invention.

Referring to FIG. 4, a flow diagram of an example implementation of a method 160 for upgrading software is shown in accordance with a preferred embodiment of the present invention. The upgrade method (or process) 160 may be implemented in the controller server 112 and the encoder servers 106a-106n. The method 160 generally comprises a step (or state) 162, a step (or state) 164, a step (or state) 166, a step (or state) 168, a step (or state) 170, a step (or state) 172, a step (or state) 174, a step (or state) 176, a step (or state) 178, a step (or state) 180, a step (or state) 182, a step (or state) 184, a step (or state) 186, a step (or state) 188 and a step (or state) 190. The steps 162-190 of the method 160 may be implemented in hardware, software executing on hardware, firmware executing on hardware or any combination thereof.

The upgrade method 140 may begin with the controller server 112 performing normal operations in the step 162 and one or more of the encoder servers 106a-106n performing normal operations in the step 164. The controller server 112 may begin the upgrade in the step 166 and thus shut down access to the database 114 for the encoder servers 106a-106n in the step 168.

When the code on the controller server 112 is upgraded, the controller server 112 may remove all encoder servers 106-106n from being able to access the database 114. Therefore, the process managing the database access and the process managing the redundant data channel 122 may be shut down. At such a point in time, the encoder servers 106a-106n may be running without database access, without access to the redundant data channel 122 and without the handshaking process as indicated by the step 170. Any events that happen on the encoder servers 106a-106n that normally result in data being transferred to the database 114 may be stored in a queue on the corresponding encoder servers 106a-106n in the step 172. The encoder servers 106a-106n may repeatedly query the controller server 112 in the steps 174 and 176 to determine if the controller server 112 is communicating on the redundant data channel 122, and to attempt to handshake with the controller server 112.

When the controller server 112 finishes upgrading in the step 178, the process that manages the access to the database 114 and the processes that control the redundant data channel 122 may be started. Once an encoder server 106a-106n (e.g., encoder server 106a) has determined that the controller server 112 is back up in the step 176 by receiving a response to the handshakes, that encoder server 106a may simultaneously begin to transmit the data stored in the queue over the redundant data channel 122 in the step 182, and the encoder server 106a may attempt to handshake with the controller server 112 in the steps 186 and 188. The controller server 112 may update the database 114 with the data received via the redundant data channel 122 in the step 182. Thereafter, the controller server 112 may attempt to upgrade the encoder server 106a in the step 184.

For each encoder server 106a-106n that successfully handshakes with the controller node in the step 186 (e.g., occurs when the controller server 112 was reconfigured and not upgraded, or if the upgraded code on the controller server 112 is compatible with the older version running on the encoder servers 106a-106n), the connections between the corresponding encoder servers 106a-106n and the database 114 via the main data channel 120 are generally restored. Such encoder servers 106a-106n may subsequently abandon the redundant data channel 122 per the step 190 in preference to direct access to the database 114 via the main data channel 120.

If the handshake by an encoder server 106a-106n (e.g., the encoder server 106a) with the controller server 112 is denied (e.g., may occur if the upgraded code on the controller server 112 is incompatible with an older version running on the encoder server 106a), the encoder server 106a generally continues to transfer data to the controller server 112 over the redundant data channel 122.

Figure 5:
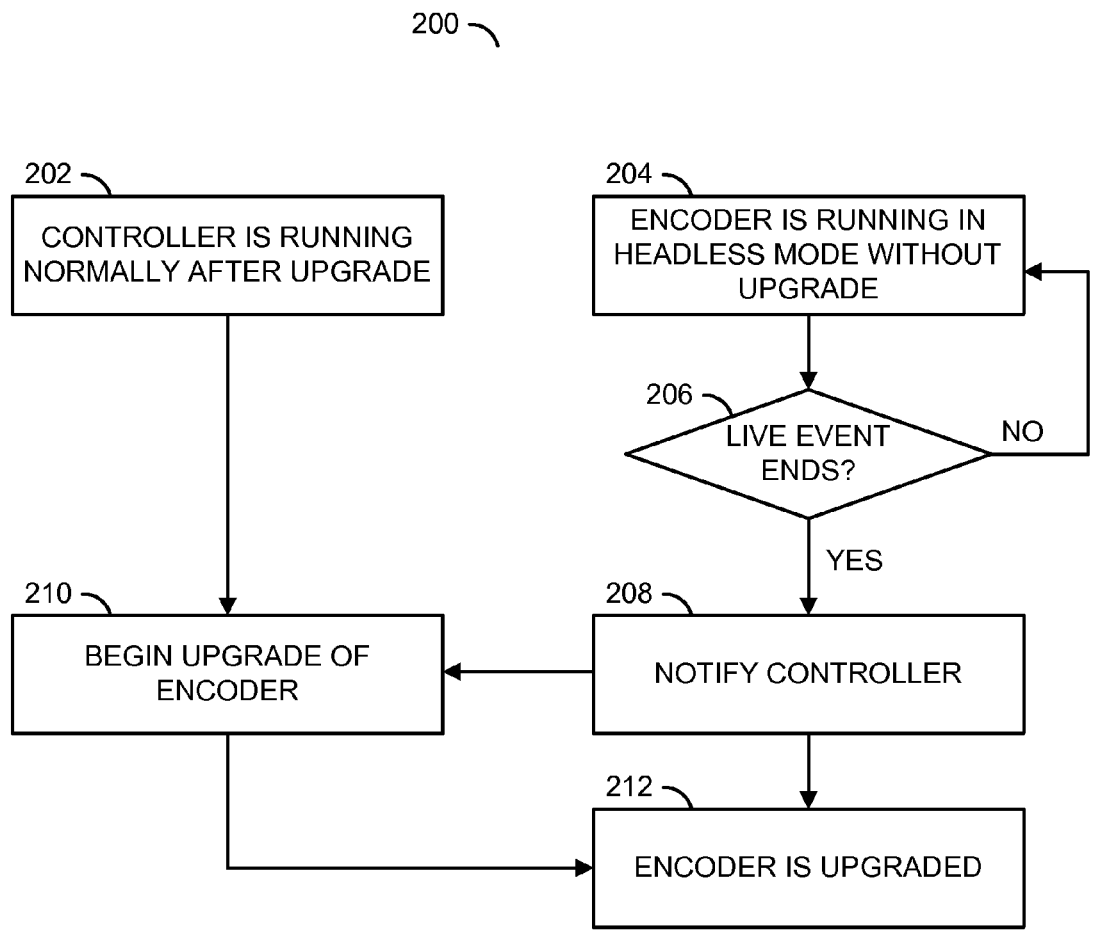
FIG. 5 is a flow diagram of an example implementation of a method for upgrading encoder servers via a controller server.

Referring to FIG. 5, a flow diagram of an example implementation of a method 200 for upgrading the encoder servers 106a-106n via the controller server 112 is shown. The upgrade method (or process) 200 may be implemented in the controller server 112 and the encoder servers 106a-106n. The method 200 generally comprises a step (or state) 202, a step (or state) 204, a step (or state) 206, a step (or state) 208, a step (or state) 210 and a step (or state) 212. The steps 202-212 of the method 200 may be implemented in hardware, software executing on hardware, firmware executing on hardware or any combination thereof.

The controller server 112 may be operating normally in the step 202 after an update. While the controller server 112 and an encoder server 106a-106n (e.g., encoder server 106a) are only connected via the redundant data channel 122, all data on the running live events on the encoder server 106a may be preserved in the step 204. The controller server 112 and the encoder server 106a may continue communicating in such a fashion indefinitely, allowing the encoder server 106a to continue running live events in the step 204. Keeping a cluster of encoder servers 106a-106n operating during the upgrade of the controller server 112 generally allows minimal disruption in live event transmissions.

Running (or processing or executing) the live events may continue without connecting to the database 114. The primary encoder servers 106a-106n may continue encoding/transcoding the live events while the backup servers 106a-106n are being upgraded to new software. When the backup encoder servers 106a-106n have been upgraded and are connected to the controller database 114, new live events may be started on the upgraded encoder servers 106a-106n. Current live events on the non-upgraded encoder servers 106a-106n may be stopped once the events have ended in the step 206. The non-upgraded encoder servers 106a-106n may notify the controller server 112 in the step 208, be disconnected from the cluster in the step 210 and subsequently upgraded by the controller server 112 in the step 212.

In some situations, only some of the backup encoder servers 106a-106n and/or some primary encoder servers 106a-106n may be upgraded during any given period. For example, one or a few of spare and/or backup encoder servers 106a-106n may be upgraded and tested. If the upgrades were successful, other encoder servers 106a-106n may be upgraded. Furthermore, upgrading of backup encoder servers 106a-106n may be conditioned on the importance of the live event being handled by a corresponding primary encoder server 106a-106n. In some situations, a backup encoder server 106a-106n may not be upgraded during the live event so that a failure of the corresponding primary encoder server 106a-106n does not result in a significant disruption of the live event. In other situations, triple-redundancy may be implemented such that the primary encoder server 106a-106n will always have at least one operational backup encoder server 106a-106n available in case of a failure. While the primary and a backup encoder servers 106a-106n are allocated to the live event, another backup encoder server 106a-106n of the triple-redundant group may be upgraded. Other sequences of upgrades to the encoder servers 106a-106n may be implemented to meet the criteria of a particular application.

Figure 6:
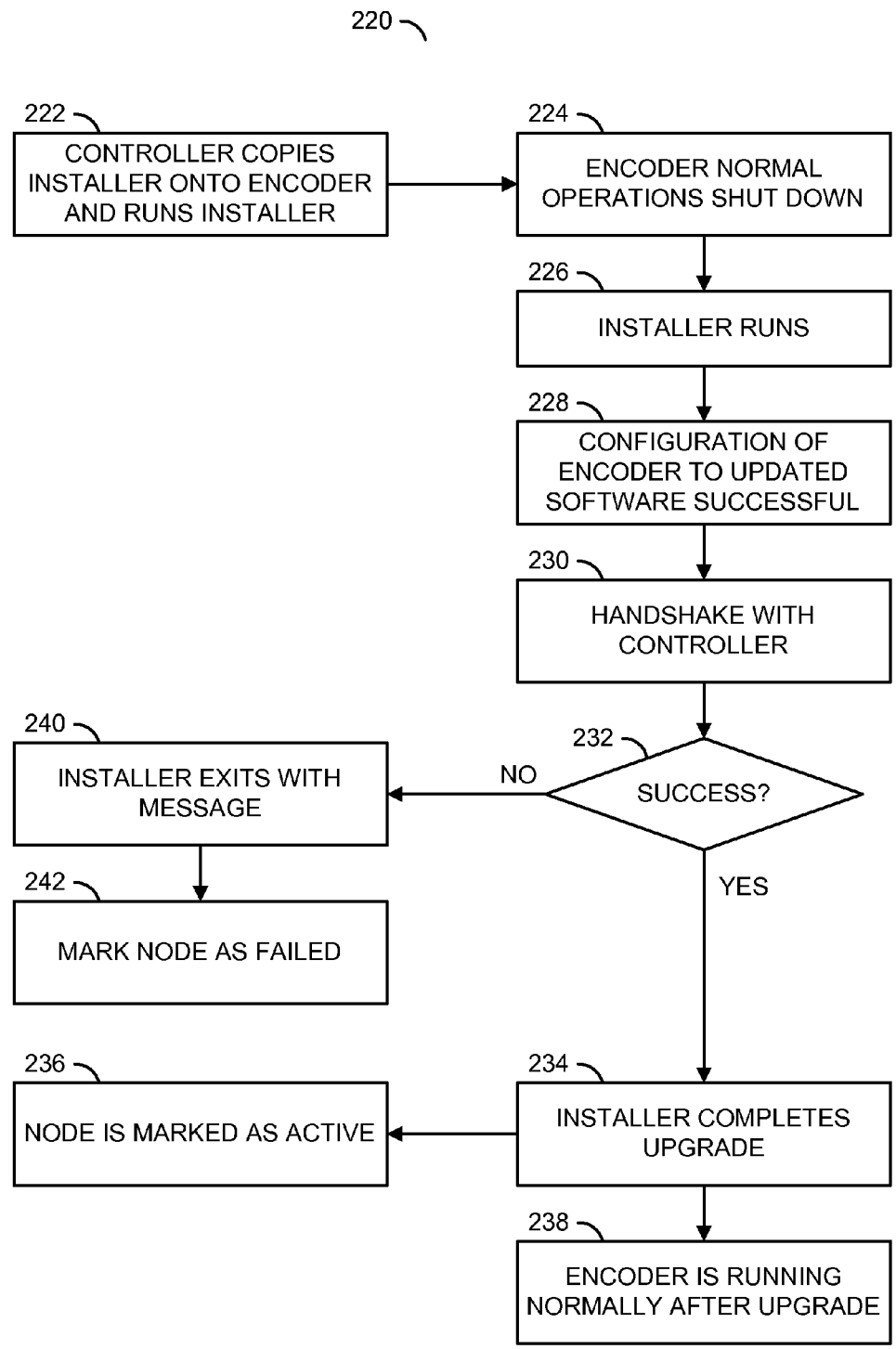
FIG. 6 is a flow diagram of an example implementation of a method for controlling the upgrade of the encoder servers.

Referring to FIG. 6, a flow diagram of an example implementation of a method 220 for controlling the upgrade of the encoder servers 106a-106n is shown. The control method (or process) 220 may be implemented in the controller server 112 and the encoder servers 106a-106n. The method 220 generally comprises a step (or state) 222, a step (or state) 224, a step (or state) 226, a step (or state) 228, a step (or state) 230, a step (or state) 232, a step (or state) 234, a step (or state) 236, a step (or state) 238, a step (or state) 240 and a step (or state) 242. The steps 222-242 of the method 220 may be implemented in hardware, software executing on hardware, firmware executing on hardware or any combination thereof.

When all live events running on one or more of the non-upgraded encoder servers 106a-106n are finally stopped (e.g., see step 206 in FIG. 5), the corresponding encoder servers 106a-106n no longer running the live events may be upgraded to code that is compatible with the controller server 112. In the step 222, the controller server 112 may copy one or more installer programs onto one or more encoder servers 106a-106n being upgraded (or reconfigured). Normal operations on the encoder servers 106a-106n may be shut down in the step 224 and the installer programs may be executed. The installer programs may be executed to upgrade the software and/or firmware of the encoder servers 106a-106n in the step 226.

After the code configuration process has successfully completed in the step 228, the encoder servers 106a-106n generally handshake with the controller server 112 in the step 230. Once a handshake is accepted by the controller server 112 in the step 232, access to the database 114 is generally restored to the upgraded encoder servers 106a-106n in the step 234. The installer programs running on the active encoder servers 106a-106 may also complete in the step 234. The controller server 112 may mark each encoder server 106a-106n that has successfully completed the handshake as an active node in the step 236. The upgraded encoder servers 106a-106n may subsequently begin running live events again in the step 238, and the controller server 112 and the encoder servers 106a-106n may move back to the initial running state. If the handshake operation fails, the installer may exit with an error message in the step 240. The controller server 112 may mark such encoder servers 106a-106n as failed in the step 242.

Figure 7:
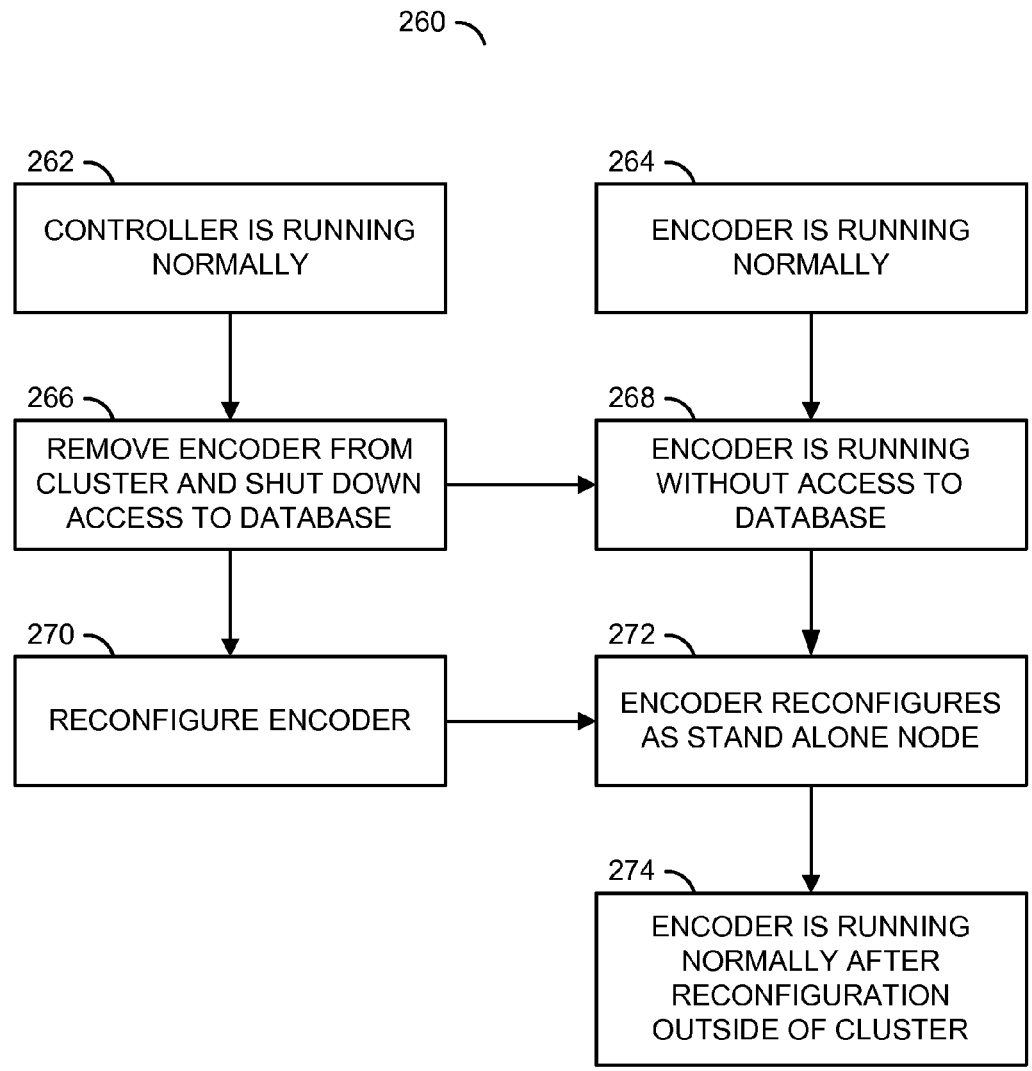
FIG. 7 is a flow diagram of an example implementation of a method for removing an encoder server from a cluster.

Referring to FIG. 7, a flow diagram of an example implementation of a method 260 for removing an encoder server 106a-106n from a cluster is shown. The removal method (or process) 260 may be implemented in the controller server 112 and the encoder servers 106a-106n. The method 260 generally comprises a step (or state) 262, a step (or state) 264, a step (or state) 266, a step (or state) 268, a step (or state) 270, a step (or state) 272 and a step (or state) 274. The steps 262-274 of the method 270 may be implemented in hardware, software executing on hardware, firmware executing on hardware or any combination thereof.

The controller server 112 may be running as normal in the step 262 and the encoder servers 106a-106n may be running as normal in the step 264 when the controller server 112 begins the operation to remove one or more encoder servers 106a-106n from a cluster (e.g., a group of two or more encoder servers 106a-106n). The controller server 112 may deny the removed encoder servers 106a-106n access to the database 114 in the step 266. Therefore, the encoder servers 106a-106n that have been removed may continue running in the step 268 without database access. The controller server 112 may subsequently command the removed encoder servers 106a-106n to operate as stand-alone (or headless) nodes in the step 270. The removed encoder servers 106a-106n may respond by reconfiguring to the stand-alone mode in the step 272. In the stand-alone mode, each encoder server 106a-106n may host a local database and may no longer rely on the controller database 114. After the reconfiguration has completed, the removed encoder servers 106a-106n may run normal operations outside and independent of the cluster in the step 274.

Figure 8:
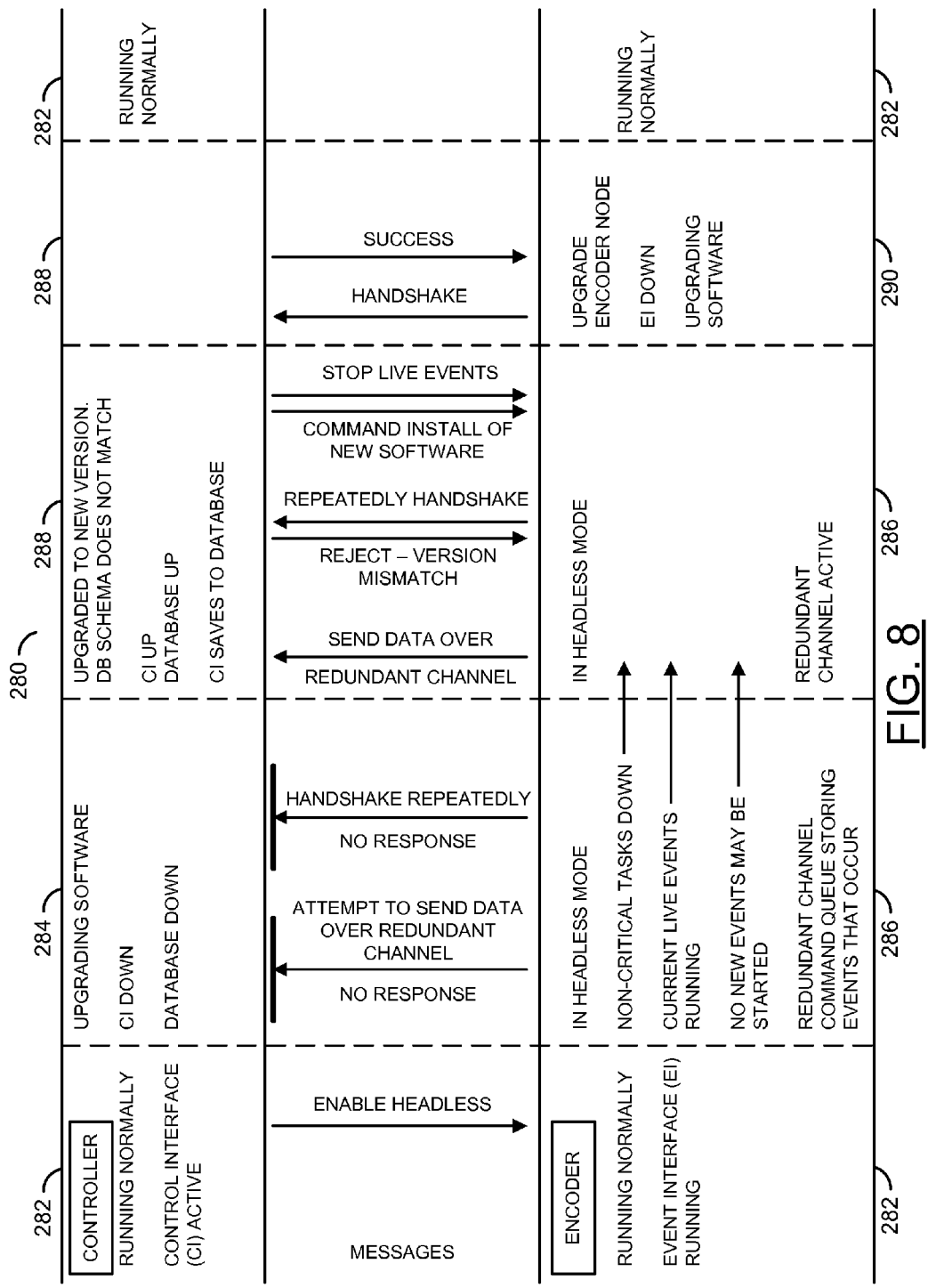
FIG. 8 is a diagram of an example states of the controller server and the encoder servers.

Referring to FIG. 8, a diagram of an example states 280 of the controller server 112 and the encoder servers 106a-106n is shown. The states (or modes) 280 generally comprise a state (or mode) 282, a state (or mode) 284, a state (or mode) 286, a state (or mode) 288 and a state (or mode) 290. The different states may be implemented during normal operations, controller server upgrades, encoder server upgrades and headless operations.

In a normal state (or mode) 282, the control interface module (e.g., CI) 116 of the controller server 112 may be active. The event interface modules (e.g., EI) 118 in each of the active encoder servers 106a-106n may also be active in the state 282.

In a controller upgrade state (or mode) 284, the controller server 112 may command the encoder servers 106a-106n into a headless state (or mode) 286. The control interface module 116 in the controller server 112 may shut down. Access to the database 114 may also be shut down. The encoder servers 106a-106n in the headless state 286 may stop some tasks (e.g., non-critical tasks) while keeping live events running. No new events are generally started while an encoder server 106a-106n is in the headless state 286. Any data that should be posted to the database 114 may be stored in a queue locally until the controller server 112 has finished the upgrade. Attempts to handshake over the redundant data channel 122 generally do not produce a response from the controller server 112 during the upgrade. Attempts to send the queued data to the controller server 112 via the redundant data channel 122 may also fail to produce a response from the controller server 112.

Once the controller server 112 has achieved an upgraded condition in a state (or mode) 288, the control interface module 116 may be active and limited access to the database 114 may be restored. The headless encoder servers 106a-106n may send the queued data via the redundant data channel 122 to the controller server 112. The headless encoder servers 106a-106n may also repeatedly attempt to handshake with (or query) the controller server 112. The controller server 112 may reject the handshakes due to mismatches in the software and/or firmware.

As each headless encoder server 106a-106n ends work on the corresponding live events, the controller server 112 may send the installer programs to the corresponding headless encoder servers 106a-106n. The encoder servers 106a-106n may enter an upgrade state (or mode) 290, shut down the event interface modules 118 and perform the upgrades. After a successful encoder upgrade, each upgraded encoder server 106a-106n may attempt to handshake with the controller server 112. Once the handshake is successful, the upgraded encoder server 106a-106n may return to the normal state 282.

Figure 9:
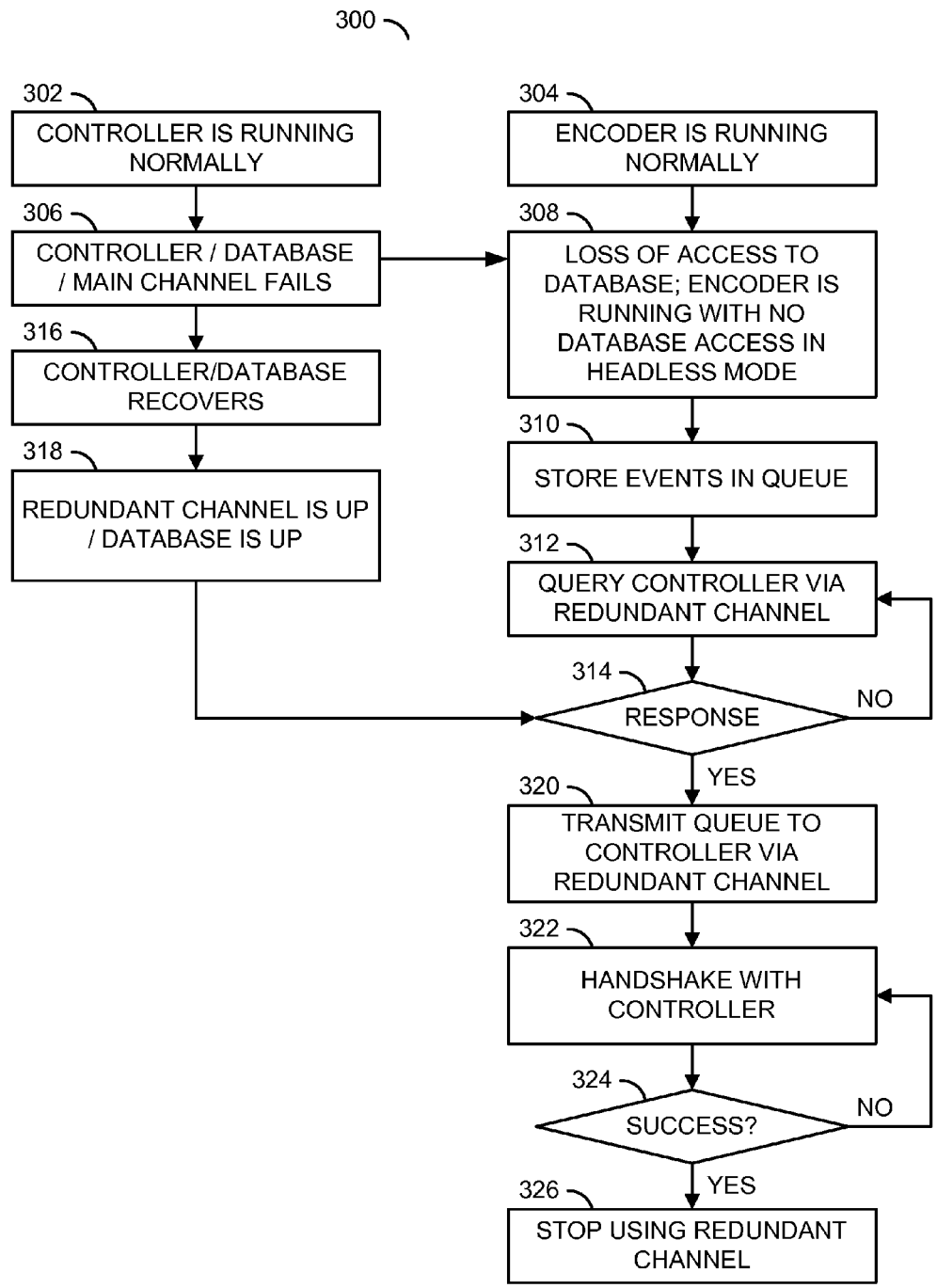
FIG. 9 is a flow diagram of an example implementation of a failure recovery method.

Referring to FIG. 9, a flow diagram of an example implementation of a failure recovery method 300 is shown. The recovery method (or process) 300 may be implemented in the controller server 112 and the encoder servers 106a-106n. The method 300 generally comprises a step (or state) 302, a step (or state) 304, a step (or state) 306, a step (or state) 308, a step (or state) 310, a step (or state) 312, a step (or state) 314, a step (or state) 316, a step (or state) 318, a step (or state) 320, a step (or state) 322, a step (or state) 324 and a step (or state) 326. The steps 302-326 of the method 300 may be implemented in hardware, software executing on hardware, firmware executing on hardware or any combination thereof.

The method generally begins with the controller server 112 operating normally in the step 302 and the encoder servers 106a-106n operating normally in the step 304. At a point in time, the controller server 112, the database 114 and/or the main data channel 120 may fail, as indicated by the step 306. Therefore, the encoder servers 106a-106 may experience a loss of access to the database 114 and so continue running without the database access. Upon sensing the failure, the encoder servers 106a-106n may automatically transition into the headless state 286 in the step 308. Since the encoder servers 106a-106n cannot store data in the database 114 while in the headless state 286, the encoder servers 106a-106n may buffer the data corresponding to the encoding/transcoding operations in a local queue in the step 310. Each encoder server 106a-106n may repeatedly query (or handshake) the controller server 112 via the redundant data channel 122 in the steps 312 and 314.

After the failure has been resolved, the controller server 112 and the database 114 may resume operations in the step 316. The controller server 112 may respond to the queries via the redundant data channel 122 and provide restricted (e.g., one-way or write-only) access to the database 114 in the step 318. The encoder servers 106a-106n may transmit the queued data to the controller server 112 in the step 320 which subsequently stores the data in the database 114.

The encoder servers 106a-106n may repeatedly attempt to handshake with the controller server 112 via the main data channel 120 in the steps 322 and 324. If the software versions are incompatible, the handshakes may be rejected in the step 324. If the software versions are compatible, the handshakes are generally accepted in the step 324, the encoder servers 106a-106n may stop using the redundant data channel 122 in the step 326 and resume using the main channel 120.

When any encoder server 106a-106n is in the headless (or disconnected) state 286, a minimal user interface may be used to query information about the data currently in the queue for transmission over the redundant data channel 122. The information in the queue may also be stored on a hard disk of the corresponding encoder server 106a-106n to prevent data loss if the encoder server 106a-106n crashes while disconnected from the database 114 and from the redundant data channel 122.

During a fail-over of one of the encoder servers 106a-106n in a redundant pair of encoder servers 106a-106n (e.g., 106a and 106b), the surviving encoder server 106a-106n of the pair may take over operations from the failed encoder server 106a-106n. Switching operations between the encoder servers 106a-106n may be controlled by the controller server 112 while in the normal state 282. If the encoder servers 106a-106n are operating in the headless state 286, the surviving encoder server 106a-106n may take over for the failed encoder server 106a-106n independently of the controller server 112.

The server 112 may implement a variety of database management systems. The database 114 may implement a corresponding type of database For example, the MySQL database manager may be implemented to control a MySQL database. Other database management systems and databases may be implemented to meet the criteria of a particular application.

A variety of communication mechanisms may be used to relay information from the disconnected encoder servers 106a-106n to the controller server 112. For example, a DRb communication mechanism may be implemented, which allows two Ruby-programmed processes to communicate. Other methods generally include, but are not limited to, user datagram protocol (e.g., UDP), HTTP or transmission control protocol (e.g., TCP) may be implemented for the communications.

Some embodiments of the present invention generally provide an upgrade (or update or reconfiguration) process of a controller node controlling multiple encoder nodes that may be transcoding live events. The upgrade process generally prevents incompatible encoder nodes from accessing the upgraded database on or via the controller node. Connecting to an incompatible database may cause the encoder nodes to crash, which may disrupt the live events running on the encoder nodes.

The encoder nodes running various events may have different windows in time to be upgraded. Some encoder nodes may be running live events that may not be stopped until a particular time (e.g., at an end of the live events). The redundant data channel 122 generally allows the upgrade process of the controller node and the encoder nodes to be distributed over a long period while simultaneously preventing the loss of data. The controlled upgrade may provide a more pleasant upgrade experience.

The functions performed by the diagrams of FIGS. 1-9 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method for upgrading software, comprising the steps of:
   (A) denying a first server access to read from and write to a database controlled by a second server while second software in said second server is being upgraded, wherein (i) said second software as upgraded is incompatible with first software running in said first server, (ii) said first server is configured to present content to one or more clients based on a plurality of parameters and (iii) said second server is configured to control said parameters;
   (B) queuing data in said first server in response to a current operation of said first software while said second software is being upgraded;
   (C) updating said database by transferring said data from said first server to said database through said second server after said upgrade of said second software has finished, wherein said first server remains denied to read from said database;
   (D) upgrading third software in a third server while said first server is performing said current operation, wherein said third server is redundant to said first server; and
   (E) upgrading said first software to be compatible with said second software in response to finishing said current operation so that said first server can read from said database, wherein said first server, said second server and said third server are in separate computers.

2. The method according to claim 1, wherein said current operation comprises transcoding video of a live event.

3. The method according to claim 1, wherein (i) said first server reads from said database through a first channel that provides a main pathway while said first software and said second software are compatible and (ii) said data is transferred on a second channel that provides a redundant pathway from said first server to said second server while said first software and said second software are incompatible.

4. The method according to claim 3, further comprising the step of:
   handshaking repeatedly with said second server from said first server via said second channel while said second software is being upgraded.

5. The method according to claim 1, further comprising the step of:
   denying an upgrade of said first software while a live event is running.

6. The method according to claim 1, further comprising the step of:
   storing said data in a queue of said first server in response to a loss of communication with said database via a first channel that provides a main pathway while said first software is compatible with said second software, wherein said loss of said communication is due to at least one failure among (i) said database, (ii) said second server and (iii) said first channel.

7. The method according to claim 6, further comprising the step of:

handshaking repeatedly with said second server from said first server via a second channel that provides a redundant pathway while said communication on said first channel is lost.

8. The method according to claim 7, further comprising the step of:
transmitting said data from said queue to said second server via said second channel in response to said second server responding to said handshaking.

9. The method according to claim 7, further comprising the step of:
resuming communication on said first channel.

10. An apparatus comprising:
a first server configured to queue data in response to a current operation of first software while second software is being upgraded;
a second server configured to (i) deny said first server access to read from and write to a database controlled by said second server while said second software in said second server is being upgraded, wherein said second software as upgraded is incompatible with said first software running in said first server, (ii) update said database by transferring said data from said first server to said database after said upgrade of said second software has finished, wherein said first server remains denied to read from said database, and (iii) upgrade said first software to be compatible with said second software in response to finishing said current operation; and
a third server having third software upgraded by said second server while said first server is performing said current operation, wherein (i) said third server is redundant to said first server and (ii) said first server, said second server and said third server are in separate computers.

11. The apparatus according to claim 10, wherein said current operation comprises transcoding video of a live event.

12. The apparatus according to claim 10, wherein (i) said first server reads from said database through a first channel that provides a main pathway while said first software and said second software are compatible and (ii) said data is transferred on a second channel that provides a redundant pathway from said first server to said second server while said first software and said second software are incompatible.

13. The apparatus according to claim 12, wherein said first server is further configured to handshake repeatedly with said second server via said second channel while said second software is being upgraded.

14. The apparatus according to claim 10, wherein said first server is further configured to deny an upgrade of said first software while a live event is running.

15. The apparatus according to claim 10, wherein (A) said first server is further configured to store said data in a queue in response to a loss of communication with said database via a first channel that provides a main pathway while said first software is compatible with said second software, and (B) said loss of said communication is due to at least one failure among (i) said database, (ii) said second server and (iii) said first channel.

16. The apparatus according to claim 15, wherein said first server is further configured to handshake repeatedly with said second server via a second channel that provides a redundant pathway while said communication on said first channel is lost.

17. The apparatus according to claim 16, wherein said first server is further configured to transmit said data to said second server via said second channel in response to said second server responding to said handshaking.

18. An apparatus comprising:
means for denying a first server access to read from and write to a database controlled by a second server while second software in said second server is being upgraded, wherein (i) said second software as upgraded is incompatible with first software running in said first server, (ii) said first server is configured to present content to one or more clients based on a plurality of parameters and said second server is configured to control said parameters;
means for queuing data in said first server in response to a current operation of said first software while said second software is being upgraded;
means for updating said database by transferring said data from said first server to said database through said second server after said upgrade of said second software has finished, wherein said first server remains denied to read from said database;
means for upgrading third software in a third server while said first server is performing said current operation, wherein said third server is redundant to said first server; and
means for upgrading said first software to be compatible with said second software in response to finishing said current operation so that said first server can read from said database, wherein said first server, said second server and said third server are in separate computers.

19. The method according to claim 1, further comprising the steps of:
copying an installer program from said second server into said first server; and
executing said installer program in said first server to upgrade said first software.

20. The apparatus according to claim 10, wherein (i) said second server is further configured to copy an installer program into said first server, and (ii) said first server is further configured to execute said installer program to upgrade said first software.

* * * * *